O. W. AHLBOM.
BICYCLE SLED.
APPLICATION FILED NOV. 17, 1919.
1,350,052.
Patented Aug. 17, 1920.
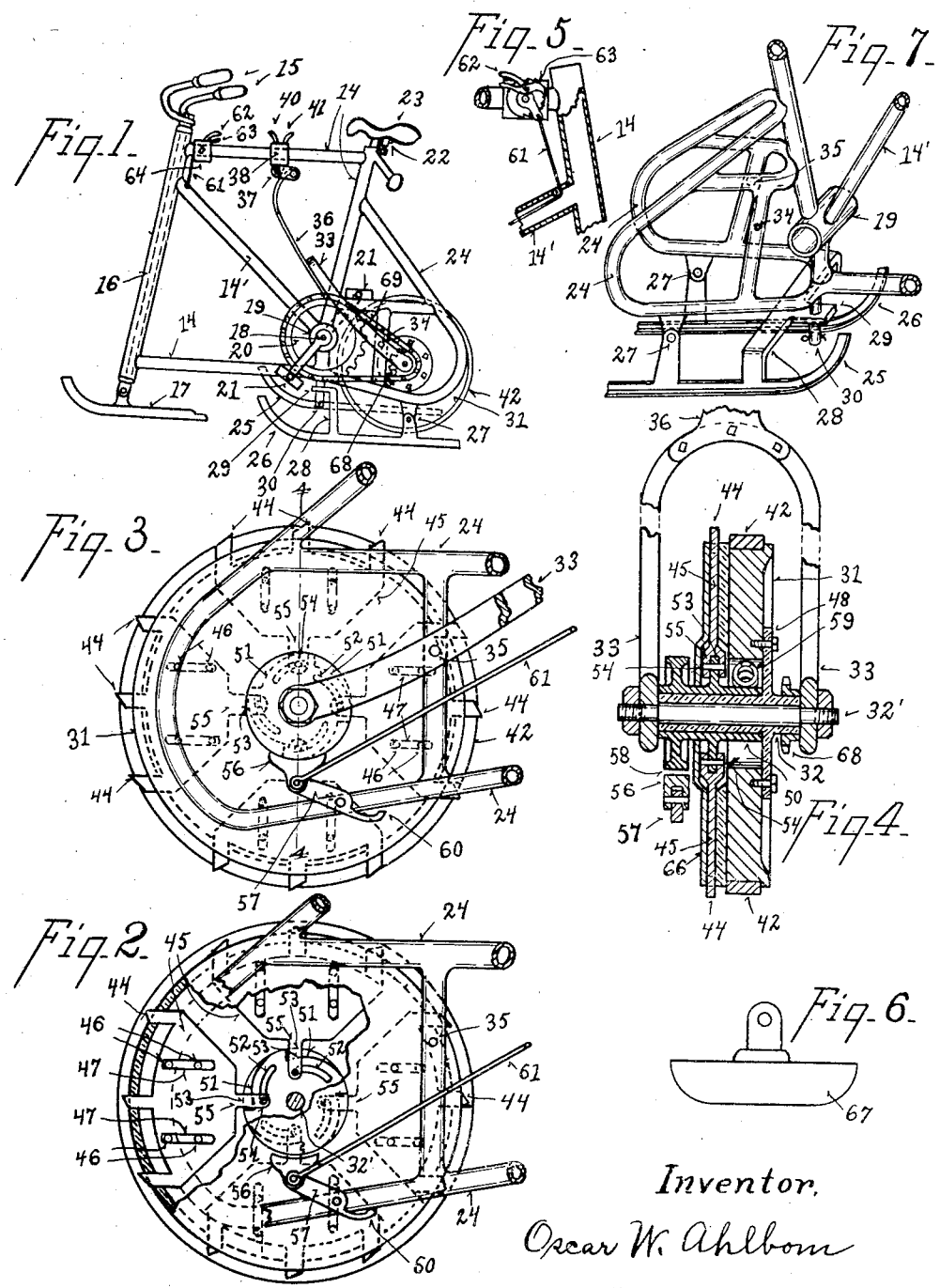
Inventor,
Oscar W. Ahlbom
By C. W. Miles,
Attorney.

UNITED STATES PATENT OFFICE.

OSCAR W. AHLBOM, OF SALT LAKE CITY, UTAH.

BICYCLE-SLED.

1,350,052.  Specification of Letters Patent.  Patented Aug. 17, 1920.

Application filed November 17, 1919. Serial No. 338,753.

*To all whom it may concern:*

Be it known that I, OSCAR W. AHLBOM, a citizen of the United States, residing at Salt Lake City, in the county of Salt Lake and State of Utah, have invented certain new and useful Improvements in Bicycle-Sleds, of which the following is a specification.

My invention relates to improvements in bicycle-sleds. One of its objects is to provide an improved arrangement and relation of frame and runners. Another object is to provide an improved propelling mechanism adapted to engage the snow or ice and propel the frame and runners relative thereto. Another object is to provide for a resilient application of engagement of the propelling mechanism with the ice or snow. Another object is to provide improved and alternate means for engaging the ice and snow with certainty, and which are also adapted to be jointly as well as alternately employed. Another object is to provide improved means to shift from one engaging means to another. My invention also comprises certain details of form, combination, and arrangement, all of which will be fully set forth in the description of the accompanying drawings, in which—

Figure 1 is a side elevation of a bicycle sled embodying my improvements.

Fig. 2 is a detail from the opposite side to that shown in Fig. 1 of the propelling mechanism.

Fig. 3 is a view similar to Fig. 2 illustrating a different position of the parts.

Fig. 4 is a sectional detail on line 4—4 of Fig. 3.

Fig. 5 is a detail of a portion of the brake shifting means.

Fig. 6 is a detail of a modification of the forward runner.

Fig. 7 is a detail of the means to support the frame relative to the rear runners.

The accompanying drawings illustrate the preferred embodiment of my invention in which 14 represents the bicycle frame provided with handle bars 15 by means of which a steering rod 16 journaled to the forward end of the frame and pivotally connected at its lower end to a steering shoe or runner 17, which is thus enabled to be turned and guided by turning the handle bars. A crank shaft 18 is journaled in a journal box 19 carried by the frame, and a sprocket wheel 20 is mounted upon said shaft, and adapted to be driven by the operator through the pedals 21. A seat-post 22 and saddle 23 are provided to support the operator. The rear portion 24 of the frame is forked and is supported upon two runners 25 and 26 respectively pivotally attached to the frame at 27 and united one to the other by a cross-bar 28 which is provided with a bracket 29 through a perforation in which the projection 30 of the frame extends so as to firmly support the rear runners in alinement with the frame and permit a limited movement upon the centers 27 by reason of a vertical movement of the bracket 29 vertically relative to the projection 30.

A propeller wheel 31 is provided with a metal hub or sleeve 32 which is journaled upon an axle 32' carried rigidly relative to a forked member 33, which in turn is pivotally supported relative to the forked portion of the frame upon centers 34 and 35. The forward portion of the forked member 33 has attached thereto a leaf-spring 36 which at its upper end is connected by a link or shackle 37 to a sleeve 38 provided with spring actuated gripping levers 40 and 41 which enable the operator to grasp said levers 40 and 41 and by pressing them together release the sleeve 38 from the frame 14 and adjust it to a new position thereon where it will be automatically gripped to the frame 14 as soon as the levers 40 and 41 are released by the operator. The endwise adjustment of the sleeve 38 serves to put more or less resilient tension on the forked member 33 tending to force the tire 42 of the wheel 31 into contact with the surface of ice or snow on which the tire rests at a point between said runners, or to relieve the pressure and lift said wheel partially or wholly out of contact with the surface of the ice. The tire 42 is preferably of rubber, and under ordinary circumstances upon a substantially level surface furnishes sufficient adhesion or tractive force to propel the frame and runners over the ice or snow. The resilient pressure of the spring 36 enables the wheel 31 to accommodate itself to inequalities in the surface of the ice or snow and to yieldingly preserve its contact therewith so as to continuously retain its tractive relation with ice or snow.

Where the surface of the ice or snow to be traversed has an upward inclination, or is uneven, soft, or otherwise of a nature so that the contact of the rubber tire 42 is insufficient to propel the vehicle, I provide a series of points or spurs, preferably at one side of the tire 42 and at the periphery of the wheel adapted to be radially projected or retracted, and which when projected serve to more effectively engage the difficult snow or ice surface to be traversed and to insure the movement of the runners over the same. The projections 44 are carried upon segments 45 which are movable radially relative to the wheel 31, as for instance by being held and guided by screws 46 passing through slots 47. The wheel 31 may be of wood, or of metal, and is secured to the flange 48 of the sleeve 32. Another sleeve 50 is journaled upon a portion of the exterior of the sleeve 32, and limited against material end play by the flange 48 at one end and one arm of the fork 33 at the opposite end. Said sleeve has a series of cam faces 51 and correspondingly curved or inclined slots 52, which cam faces are in position to engage the forked portion 53 of a series of forked inwardly directed projections 55 from the respective segments 45. Pins 54 passing through the slots 52 and the forked ends of the projections 55 serve to lock the segments 45 in operative relation to the cam faces 51. A coiled spring 59 attached at one end to the flange 48 and at the other end to the sleeve 50, and housed in the bore of the wheel 31, serves normally to hold the sleeve 50 and its cam faces 51 in position to retract the segments 45 so that their projections 44 do not engage the surface of the ice. When it is desired to thrust the projections 44 outwardly into position to engage the ice, a brake shoe 56 carried by a brake lever 57 pivotally attached to the frame section 24 is actuated to cause the brake shoe to frictionally engage a cylindrical or drum surface 58 on the sleeve 50, which opposes the action of the spring 59 and shifts the sleeve 50 and its cam faces 51 relative to the engaging faces 53 of the segments 45, thereby thrusting the projections 44 into position to engage the ice surface as indicated in Fig. 3. As soon as the brake shoe is released the spring 59 returns the sleeve 50 to its normal position and the segments 45 are retracted by the pins 54 engaging the inclined slots 52. When the brake shoe 56 and brake lever 57 actuated by gravity, or if desired by a spring are returned to their normal position as shown in Fig. 2, where the finger 60 of the brake lever 57 engages the frame section 24 and limits the movement of the brake lever. The brake lever is actuated by the operator by means of a wire or wire cable 61 attached at one end to the brake shoe or brake lever, and at the opposite end to a hand lever 62 pivotally attached to a sleeve 64 rigidly carried by the frame 14. The hand lever 62 is provided with a pawl 63 pivotally attached thereto and adapted to automatically engage ratchet teeth carried by the sleeve 64, so as to lock the hand lever in position to hold the brake shoe in engagement with the drum 58 as long as the projections 44 are required for use. When the projections are no longer required for use the pawl 63 is tripped by hand to release the brake shoe from the drum 58. As illustrated in Figs. 1 and 5 the wire 61 is housed for the greater portion of its length within one of the tubes 14' of the frame 14. If desired, where the sled is to travel over soft ice, or through snow where it would be difficult to make short or quick turns using the long runner 17 shown in Fig. 1, I propose to employ a relatively short runner 67 substantially such as shown in Fig. 6, and which is capable of making short and quick turns, and is preferable over the runner 17 for some characters of surface to be traveled over. A housing plate 66 serves to inclose and protect the segments 45 and cam mechanism of the sleeve 50 against snow, ice, or from injury. A chain 69 drives sprocket wheel 68 from sprocket wheel 20.

The mechanism herein illustrated and described is capable of considerable modification without departing from the principle of my invention.

What I claim is:

1. A bicycle-sled comprising a frame having a steering post and a saddle, a steering rod rotatably mounted in said steering post and having a runner connected thereto at its lower end and a hand lever at its upper end, a pair of runners pivotally connected to the rear portion of said frame, a pedal shaft journaled to said frame, a propeller wheel having a tire of resilient material, and a series of retractile spurs mounted upon said frame and driven from said pedal shaft and adapted to engage the surface over which the runners are to be propelled at a point between said pair of runners, and a cam wheel operable at the will of the operator to extend and retract said spurs.

2. A bicycle-sled comprising a frame having a steering post and a saddle, a steering rod rotatably mounted relative to said steering post and having a runner connected thereto at its lower end and a hand lever at its upper end, a pair of runners pivotally connected to the rear portion of said frame, a pedal shaft journaled to said frame, a propeller wheel having a tire of resilient material and a series of retractile spurs mounted upon said frame and driven from said pedal shaft and adapted to normally resiliently engage the surface over which the runners are to be propelled, and when required to simultaneously spur engage said surface.

3. A bicycle-sled comprising a frame supported upon runners and having a saddle and a manually operable steering rod by means of which one of said runners may be actuated for steering purposes, a propelling wheel having a yielding tire and a plurality of retractile spurs, said wheel being rotatably mounted upon said frame and adapted to resiliently engage the surface over which said runners are to be propelled, pedal actuated means to propel said wheel, and a wheel having closed cams to positively extend and positively retract said spurs at the will of the operator.

4. A bicycle-sled comprising in combination with a frame supported upon runners, a propelling wheel rotatably mounted relative to said frame to resiliently engage the surface over which said runners are to be propelled, a tire on said wheel to constitute the normal tractive engaging surface, a plurality of spurs carried by and adjustable radially relative to said wheel to constitute a supplemental tractive engaging surface, and means to extend and retract said spurs.

5. A bicycle-sled comprising in combination with a frame supported upon runners, a propelling wheel rotatably mounted relative to said frame to resiliently engage the surface over which said runners are to be propelled, a tire on said wheel to constitute the normal tractive engaging surface, a plurality of spurs carried by and adjustable radially relative to said wheel to constitute a supplemental tractive engaging surface, means to automatically retract said spurs from operative position, and manually operable means to extend and hold said spurs in operative position when required.

In testimony whereof I have affixed my signature.

OSCAR W. AHLBOM.